Jan. 8, 1924.
GRAF GEORG VON ARCO
1,480,320
SPEED REGULATOR FOR HIGH FREQUENCY MACHINES
Filed Oct. 25, 1922
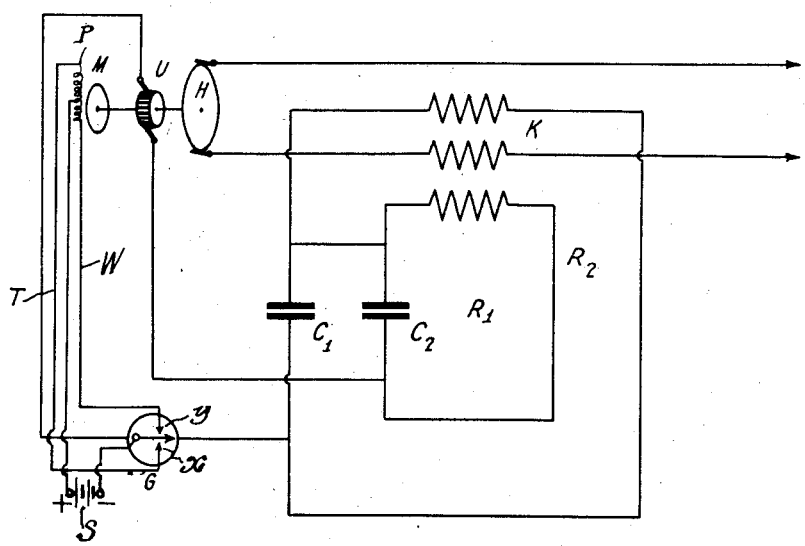
Inventor
GRAF GEORG. VON ARCO
By his Attorney Ira J Adams Patented Jan. 8, 1924.

1,480,320

UNITED STATES PATENT OFFICE.

GRAF GEORG VON ARCO, OF BERLIN, GERMANY, ASSIGNOR TO GESELLSCHAFT FÜR DRAHTLOSE TELEGRAPHIE M. B. H., OF HALLESCHES UFER 12/13 BERLIN, GERMANY.

SPEED REGULATOR FOR HIGH-FREQUENCY MACHINES.

Application filed October 25, 1922. Serial No. 596,861.

*To all whom it may concern:*

Be it known that I, GRAF GEORG VON ARCO, a citizen of the Republic of Germany, and a resident of Hallesches Ufer 12–13, Berlin, S. W. 11, Germany, have invented new and useful Improvements in Speed Regulator for High - Frequency Machines (for which I have filed an application in Germany September 12, 1921), of which the following is a specification, accompanied by drawings.

This invention relates to speed regulating means for high frequency generators. As is well known, one or two loosely coupled resonant circuits may be so arranged that, when the speed of rotation of a machine is varied, the currents or potential are also varied and this may be used for regulating the speed of rotation of the machine. The alternating currents which are used for energizing a relay or for directly influencing the field of the direct current driving motor must first be rectified so as to act like direct current. In accordance with the present invention, such rectification is accomplished by means of a mechanical interrupter.

If the shaft of the motor generator is provided with a collector interrupter, through which the alternating currents are conducted, and if the period of this interrupter is equal to the period of the alternating current, then the interrupter may operate as a rectifier since the synchronism is absolute that is, the period of the interrupter and the frequency of the alternating current are both exactly proportional to the speed of rotation of the shaft.

If the interrupter is connected in series with a direct current relay which remains in its normal position during the correct speed of rotation and moves its armature in one or the opposite direction if the speed of rotation is too high or too low, then in the well known manner the relay may be used for regulating the driving motor. It is recognized, however, that, if desired, the regulating direct current may be sent directly to the compounding winding of the motor.

The invention is illustrated in the accompanying drawing. According to this invention there are two resonant circuits $R^1$ and $R^2$ which are detuned respectively to an equal value above and below the condition of resonance. The shaft of the motor generator M carries an interrupter U and the high frequency generator H. The commutator of the interrupter U is operated at a frequency or period which is a reciprocal of the frequency of the generator H. This reciprocal may be 1/1 when the period of the interrupter is equal to the frequency of the alternating current produced by the generator as hereinbefore mentioned or it may be 1 divided by a larger quantity. The high frequency generator H supplies the resonant circuits $R^1$ and $R^2$ through the agency of coupling coils K. The energy necessary for regulating the speed of rotation is obtained from the condensers $C^1$ and $C^2$ of the two resonant circuits. The condensers are on one hand connected directly with each other and on the other hand to the direct current polarized relay G through the interrupter U. When the machine is rotating direct current energy is intermittently transmitted from the two resonant circuits $R^1$ and $R^2$ through the interrupter U to the relay G. When the speed of rotation is normal the resultant direct current that will reach the relay will be equal to zero. If the speed of rotation varies the direct current will vary in direction; if the speed of rotation decreases, the direct current will flow in one direction through the coil of relay G and if the speed increases it will flow in the other direction.

For the sake of illustration, a conventional circuit is shown in the drawing for causing the relay G to regulate the speed of the driving motor M. The circuit comprises an auxiliary coil P in the field of the driving motor M, the center of which is connected to the armature of the relay G through a source of direct current S. The ends of the auxiliary coil P are connected through wires T and W to the contacts X and Y respectively of the relay G. With this arrangement, when the armature of the relay G is caused to engage one of the contacts X or Y of the relay, a current is caused to pass through the coil P in a direction such as to cause the speed of the motor M to be decreased, whereas upon engagement of the armature of the relay G with the other of the contacts, current is caused to pass through the coil P in the opposite direction.

thereby causing the speed of the motor M to be increased.

Having described my invention, what I claim is:

1. In a system comprising a high frequency generator, the combination of a rectifier driven synchronously with the generator, a resonant circuit supplied from the generator and connected to the rectifier, and means controlled by rectified current from said circuit for regulating the speed of the generator.

2. In a system comprising a high frequency generator, the combination of a rectifier driven synchronously with the generator, two resonant circuits supplied from the generator and tuned to frequencies respectively above and below the desired generator frequency, a circuit connecting said resonant circuits and said rectifier, and means controlled by current in the last-mentioned circuit for regulating the speed of the generator.

3. In a system comprising a motor and a high frequency generator driven thereby, the combination of an interrupter driven by the motor synchronously with the generator and acting as a rectifier, a plurality of resonant circuits coupled to the generator and connected to the interrupter, and means controlled by rectified current from said circuits for regulating the speed of the motor.

4. In a system comprising a motor and a high frequency generator driven thereby, the combination of two resonant circuits coupled to the output circuit of the generator and tuned to frequencies respectively above and below the desired generator frequency, a circuit connecting said resonant circuits, and an interrupter in said last-mentioned circuit operated by the motor at a period constituting a reciprocal of the generator frequency so as to rectify the current in such circuit, and means controlled by rectified current from said last-mentioned circuit for regulating the speed of the motor and generator.

5. In a system comprising a motor and a high frequency generator driven thereby, the combination of a rectifier driven by the motor synchronously with the generator, two resonant circuits coupled to the generator, means for tuning the resonant circuits to frequencies respectively above and below the desired generator frequency, said means including a condenser in each circuit, a conductor for connecting the condensers to each other, a circuit connecting said resonant circuits and said rectifier and means controlled by current in the last-mentioned circuit for regulating the speed of the motor.

6. In a system comprising a motor and a high frequency generator driven thereby, the combination of an interrupter driven by the motor synchronously with the generator and acting as a rectifier, two resonant circuits coupled to the generator, means for tuning the resonant circuits to frequencies respectively above and below the desired generator frequency, said means including a condenser in each circuit, a conductor for connecting the condensers to each other, a circuit connecting said resonant circuits and said interrupter, a relay in said last-mentioned circuit, and a circuit controlled by the relay for regulating the speed of the motor.

GRAF GEORG von ARCO.